Feb. 24, 1953 E. QUINN ET AL 2,629,119
MACHINE FOR ASSEMBLING INSOLES AND PREFITTED UPPERS
Filed Aug. 6, 1947 7 Sheets-Sheet 1
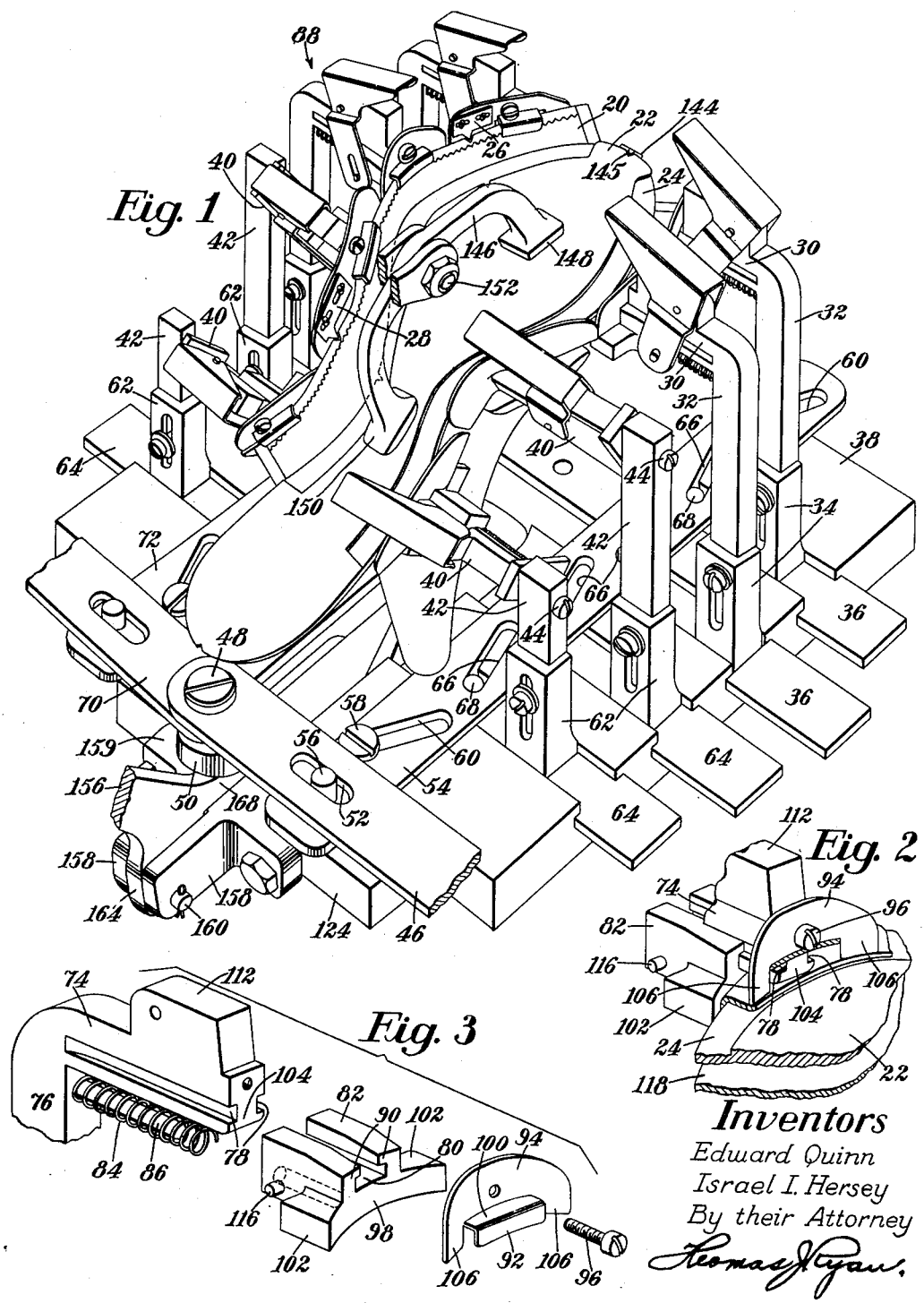
Inventors
Edward Quinn
Israel I. Hersey
By their Attorney
Thomas J. Ryan Feb. 24, 1953
E. QUINN ET AL
2,629,119
MACHINE FOR ASSEMBLING INSOLES AND PREFITTED UPPERS
Filed Aug. 6, 1947
7 Sheets-Sheet 2
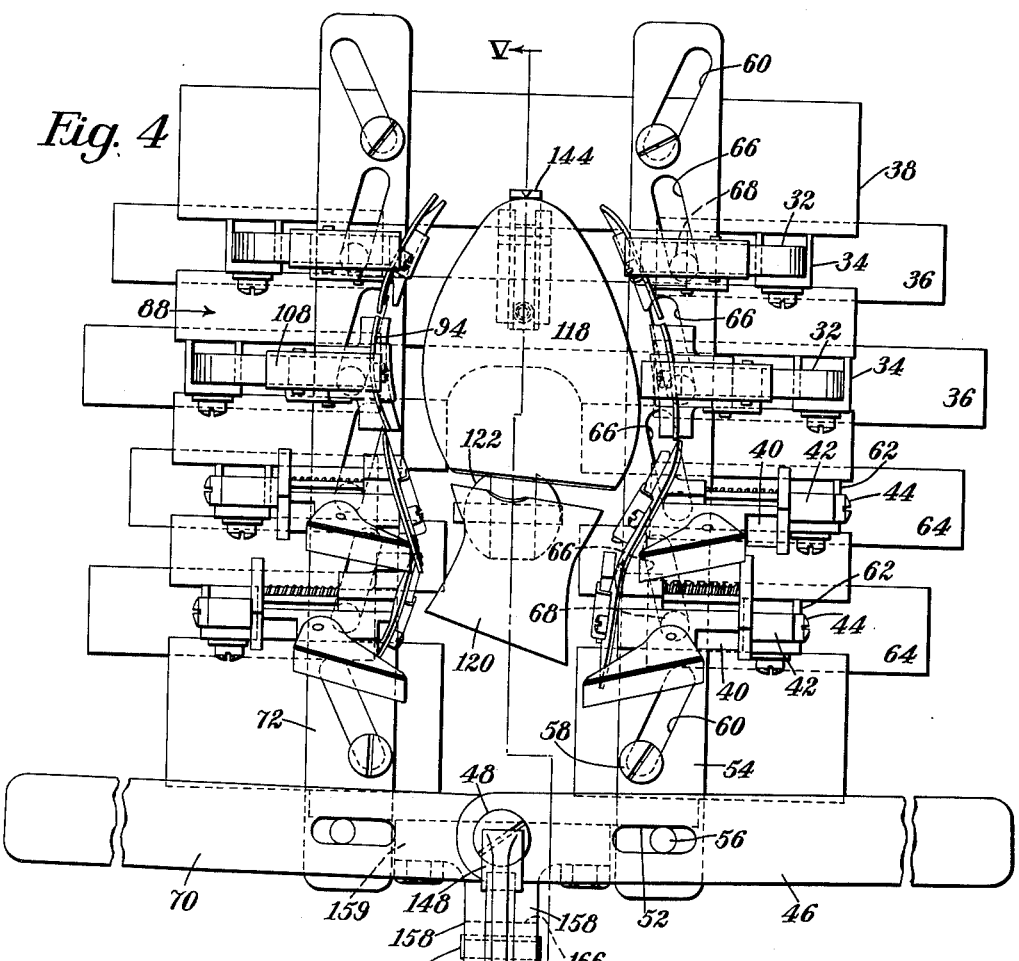
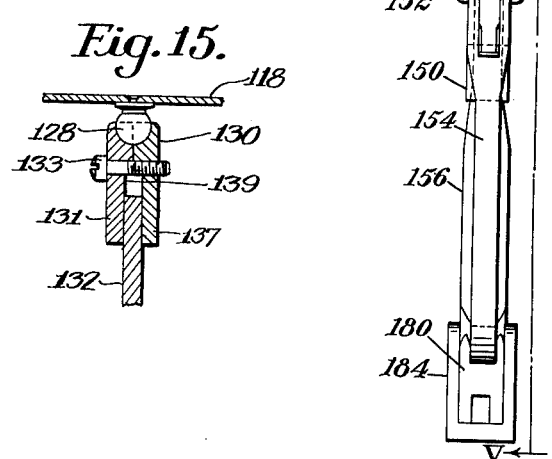
Inventors
Edward Quinn
Israel I. Hersey
By their Attorney
Thomas Ryan

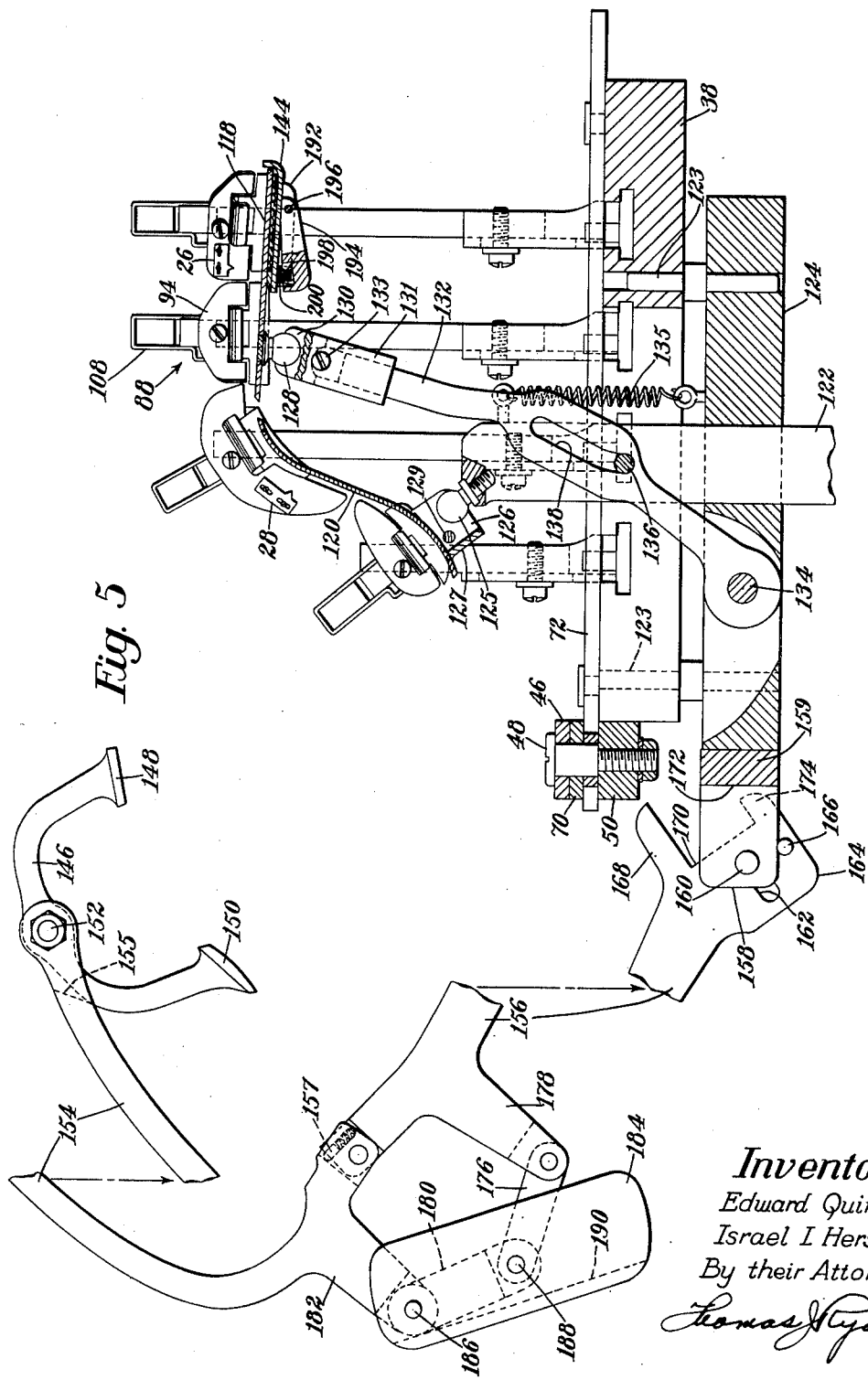

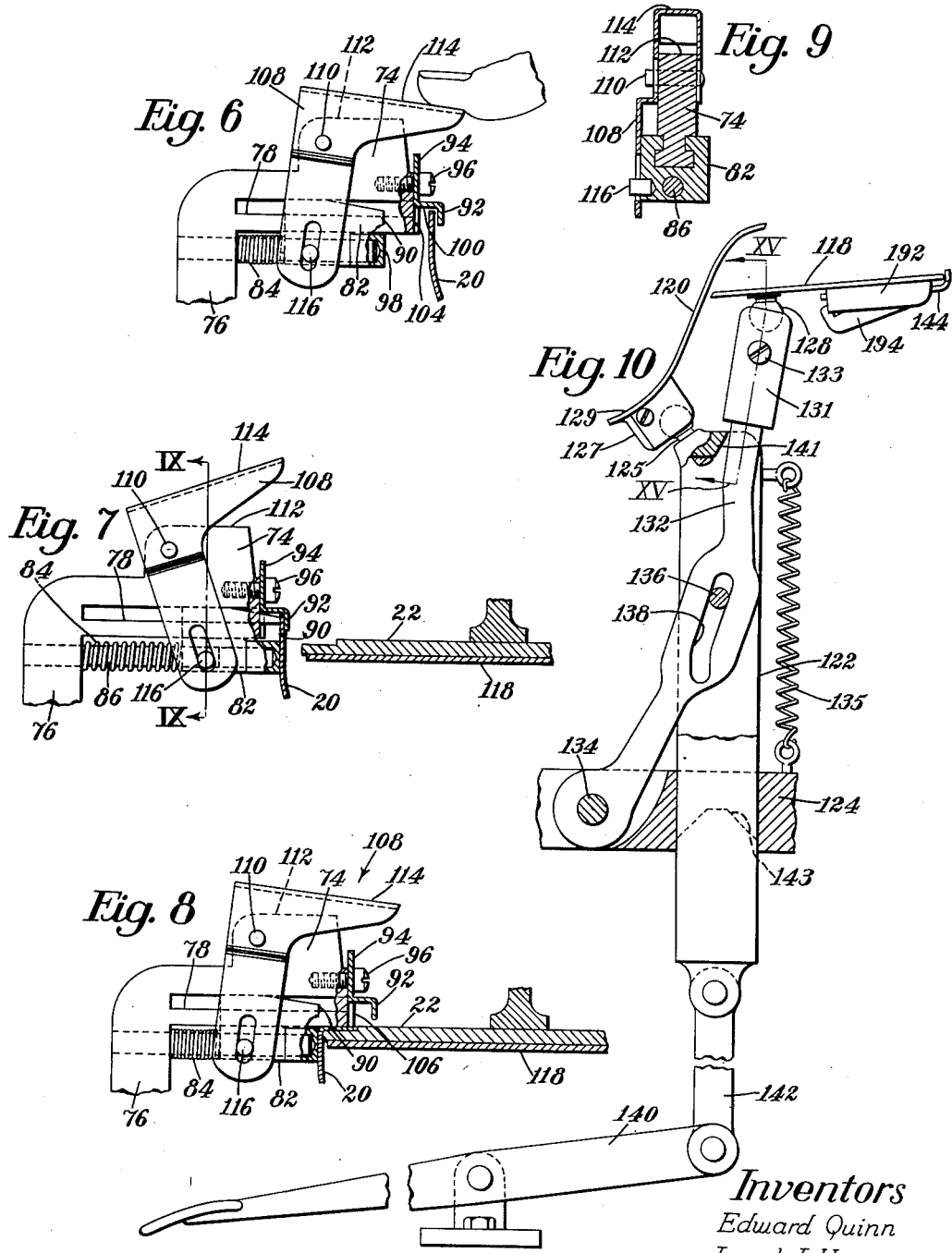

Feb. 24, 1953   E. QUINN ET AL   2,629,119
MACHINE FOR ASSEMBLING INSOLES AND PREFITTED UPPERS
Filed Aug. 6, 1947   7 Sheets-Sheet 7
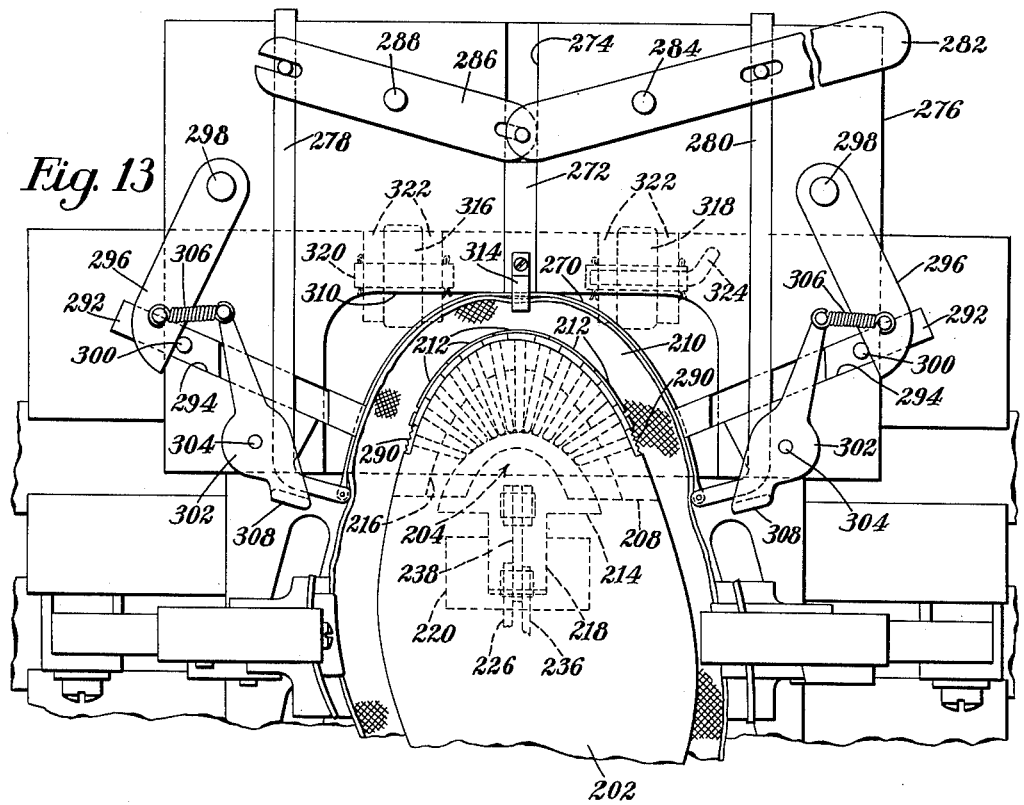
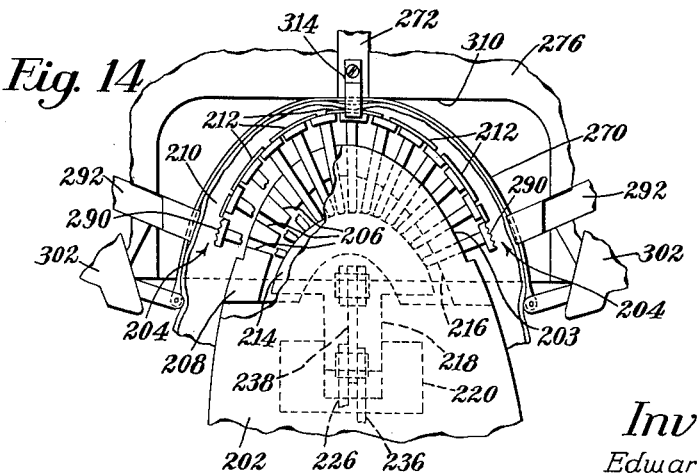
Inventors
Edward Quinn
Israel I. Hersey
By their Attorney
Thomas J. Ryan Patented Feb. 24, 1953

2,629,119

UNITED STATES PATENT OFFICE 2,629,119

MACHINE FOR ASSEMBLING INSOLES AND PREFITTED UPPERS

Edward Quinn, Saugus, and Israel I. Hersey, Beverly, Mass., assignors to United Shoe Machinery Corporation, Flemington, N. J., a corporation of New Jersey Application August 6, 1947, Serial No. 766,816

31 Claims. (Cl. 12—1)

This invention relates to shoe machines and is herein illustrated in its application to machines for assembling insoles and prefitted uppers off the last. The word "prefitted" as herein employed defines an upper the pattern of which is formed to provide an overwiping margin of predetermined width, the construction being such that after the upper and insole have been assembled in the illustrated machine a slight stretching of the upper effected by the insertion of a last or other foot shaped form into the upper in accordance with the slip lasting process of shoemaking is all that is required to give the shoe its final shape. While the invention is herein illustrated in its application to machines for assembling a prefitted upper and an insole without the aid of a last it is to be understood that the invention is not limited in its scope to machines of this type but in certain aspects is applicable to machines for shaping uppers over lasts or other forms.

In assembling prefitted uppers and insoles in the manufacture of slip lasted shoes it is usual to operate progressively lengthwise of the margins of the assembled work parts to attach them together, operating first on one side of the shoe and then on the other side. When this method of assembly is employed there is no opportunity to dispose the parts relatively to each other so as to compensate for differences in their linear dimensions, and consequently if a high degree of accuracy in the assembling operation is to be achieved the parts must not only be cut very accurately but they must be so handled in the assembling operation that there is not the slightest stretch of any one part relatively to the others or any shortening or gathering of any one of the members of the assembly since such occurrences would prevent the proper registration of the work parts at the termination of their line of attachment. It is very difficult to prevent the occurrence of a slight change in the linear dimension of some one of the work parts relatively to the other work parts, particularly when the parts are assembled in a sewing machine as is the usual practice, and consequently that degree of accuracy which good shoemaking requires in the assembly of the component parts of a shoe has seldom been achieved in the assembly of prefitted uppers and insoles in the manufacture of slip lasted shoes.

It is an object of the present invention to provide a machine for assembling prefitted uppers and insoles which will insure the accurate location of the parts relatively to each other throughout the entire extent of their line of attachment. It is a further object of the invention to provide a machine which is adapted to assemble an insole and a prefitted upper having a closed toe.

With the above objects in view the present invention in one aspect thereof consists in the provision in a machine for assembling an insole and a prefitted upper having a closed toe and an overwiping margin, of means for mounting an insole, said means being located in the space between the sides of an inverted upper in the machine and spaced from the inner surface of the upper, means for gripping the overwiping margin of the upper from the forepart heelwardly along opposite sides thereof, means for operating said gripping means to bring the overwiping margin of the upper into accurate registration with the edge face and the bottom margin of the insole, and means for shortening the linear dimension of the overwiping margin of the toe portion of the upper thereby to cause its length to correspond to the linear dimension of the edge face of the toe portion of the insole. In accordance with a feature of the invention the illustrated machine is provided with a plurality of operating units for gripping the overwiping margin of the upper and bringing it into assembled relation to the margin of the insole. Each of said units comprises relatively movable work engaging jaws constructed and arranged to receive the overwiping margin of the upper, said jaws being so constructed and arranged that they open when movement of translation of the operating unit is arrested by the edge face of the insole, and thereafter portions of the operating unit which serve as overwiping members advance to wipe the margin of the upper in over the margin of the insole while another part integral with one of the jaws maintains a pressure of the upper against the edge face of the insole thus preventing any heightwise displacement of the upper during the overwiping operation. In the illustrated organization the overwiping means are advanced positively by the actuating mechanism while means illustrated as a spring pressed slide maintains a constant pressure of the upper against the edge face of the insole. The illustrated upper engaging jaws are formed respectively in said slide and in the positively actuated assembly and said jaws open during the first stage of the advancement of the positively actuated assembly following the arrest of the slide by the edge face of the insole. Preferably there is a slight interval between the opening of the gripper jaws and the beginning of the overwiping movement sufficient to insure a complete disengagement of the gripper jaws from the upper before the wiping instrumentalities begin to operate. The illustrated operating units are individually adjustable heightwise of the upper so as to locate the wiping instrumentalities in the proper position relatively to the insole to cause them to bring the overwiping margin of the upper into intimate contact with the margin of the insole. Preferably the mutually contacting margins will have been coated with a pressure sensitive cement to cause them to adhere to each other.

For shortening the linear dimension of the overwiping margin of the toe portion of the upper before the upper is mounted on a last there is provided in accordance with a further feature of the invention means for gripping the overwiping margin at each end of that section thereof which is to be shortened, a band constructed and arranged to engage the toe portion of the upper between the gripping means, and means, herein illustrated as a hand lever, for moving the band heelwardly to bring the upper into engagement with the edge face of the insole and to conform its linear dimension to the linear dimension of said edge face. For preventing the occurrence of puckers or wrinkles in the margin of the upper during the operation of said band a plurality of yieldingly actuated presser members engage the inner surface of the upper and constantly press the upper against the band as the band is advanced to shorten the overwiping margin of the upper. The illustrated presser members are arranged to project divergently from a supporting member beneath the toe portion of the insole and the upper-engaging portions of said members are so constructed and arranged that they exert no pinching action on the inner surface of the upper as they approach each other during the operation of the band. In accordance with a further feature of the invention the upper engaging band operates after the shortening of the overwiping margin of the upper has been completed to press the upper against the edge face of the insole in order to hold the upper against heightwise displacement during the subsequent overwiping operation. The operator can readily perform the overwiping of the toe portion of the upper with his fingers after the upper shortening operation has been completed but a boning tool or any other suitable means may be employed for this purpose if desired. The illustrated band for shortening the toe portion of the overwiping margin of the upper is mounted in a head constructed and arranged for movement into a position remote from the upper to facilitate the removal of the assembled upper and insole from the machine.

These and other features of the invention will now be described with reference to the accompanying drawings and pointed out in the appended claims.

In the drawings,

Fig. 1 is a perspective view of a machine embodying the present invention, said machine being constructed and arranged to assemble uppers and insoles of women's shoes having open toes and open heels, certain parts of the machine being broken away for convenience of illustration;

Fig. 2 is a perspective view illustrating an operating unit, shown in Fig. 1, as it appears just prior to the completion of the overwiping operation;

Fig. 3 is an exploded perspective view illustrating the operating unit shown in Fig. 2;

Fig. 4 is a plan view of the machine illustrated in Fig. 1;

Fig. 5 is a sectional elevation taken substantially on the line V—V of Fig. 4;

Figs. 6, 7 and 8 illustrate the operating unit shown in Figs. 2 and 3 at successive stages in its operation on the work;

Fig. 9 is a section taken on the line IX—IX of Fig. 7;

Fig. 10 is a side elevation illustrating the insole supporting plates in disassembled position together with the mounting and actuating mechanisms for said plates, certain parts being broken away for convenience of illustration;

Fig. 13 is a plan view illustrating particularly the mechanism in said modified construction for preparing the toe portion of the upper for assembly with the insole;

Fig. 14 is a plan view illustrating certain operating mechanisms shown in Fig. 13 as they appear at a later stage in the operation of the machine; and Fig. 15 is a section taken on the line XV—XV of Fig. 10.

Figure 12:
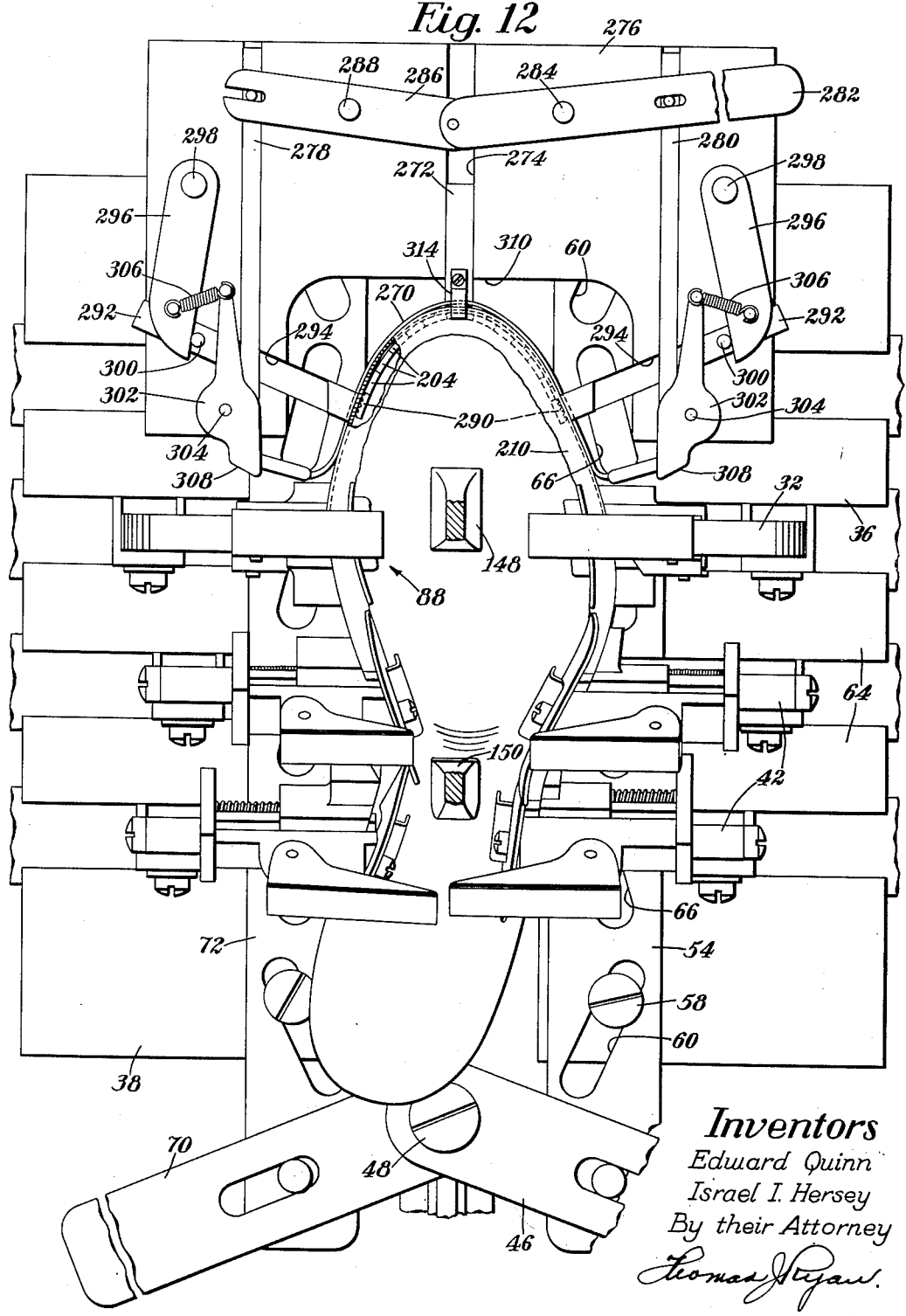
Fig. 12 is a plan view of the machine illustrated in Fig. 11.

The invention is illustrated in the drawings as embodied in two alternative machines. Illustrated in Fig. 1 is a machine constructed and arranged to assemble an insole and a prefitted upper having an open toe and an open heel. The alternative machine illustrated in Fig. 12 is constructed and arranged to assemble an insole and an upper having a closed toe and an open heel.

Referring now to Fig. 1 the numeral 20 identifies an upper having an open toe and an open heel and the numeral 22 identifies an insole the opposite side margins of which from the breast line toewardly are rabbeted to receive the overwiping margins of the upper, the rabbeted portions of the insole being indicated by the numeral 24. The rabbeted portions 24 of the insole and the overwiping margins of the upper 20 are coated with cement to cause them to adhere to each other upon the completion of the assembling operation. The machine illustrated in Fig. 1 is provided with mechanism for supporting an insole which is bent to assume the same longitudinal contour which it will have in the completed shoe, suitable clamping means being provided for securely holding the insole in an accurately predetermined position on the insole supporting mechanism while the upper 20 is assembled thereto. For assembling the upper to the insole 22, operating units are provided, there being eight of said units, four at each side of the machine. Each of these units is provided with upper gripping mechanism constructed and arranged to engage the overwiping margin of the upper and support it relatively to the insole so as to cause a predetermined width of upper material to project upwardly from the plane of the insole. The four units at each side of the machine are advanced simultaneously by manually operated mechanism. During the first stage of the advancement of said units the upper is brought into engagement with the edge face of the insole and gripped against said edge face by pressing means incorporated in each of the eight units, thereby to hold the upper against heightwise displacement after the gripper jaws have opened. During the latter portion of the operation of said units the upper gripping jaws open and wiping mechanism incorporated in each of said units operates after said jaws have opened to wipe the margin of the upper inwardly over the rabbeted marginal portion of the insole. Preferably, the width of the overwiping margin of the upper corresponds exactly to the width of the rabbeted portion of the insole, thus providing a substantially continuous surface for attachment to an outsole, and insuring the construction of a shoe the bottom of which has no cavities therein which may cause recession of portions of the insole during the wear of the shoe. The length of the rabbeted portion 24 of the insole corresponds exactly to the length of the overwiping margin of the upper and said overwiping margin is caused to register accurately longitudinally thereof with the rabbeted portion of the insole by bringing a match mark herein illustrated as a V notch in the forepart of said overwiping margin into registration with an indicator mounted on the operating unit at the toe end of the insole, said indicator being illustrated in Fig. 1 as a plate 26 having a downwardly directed V-shaped finger. A similar indicator 28 is mounted on the operating unit opposite the shank portion of the insole and registers with a V notch suitably located in the overwiping margin of the upper. It will be understood that similar indicators are mounted on corresponding operating units at the opposite side of the insole and that the overwiping margin at that side of the upper is notched to register with said indicators. The operating units are adjustable heightwise of the upper to determine the width of the overwiping margin of the upper, and the four operating units nearest the heel end of the insole are constructed and arranged for swiveling adjustment on an axis extending widthwise of the insole so that they may be positioned at an angle corresponding to the inclination of the shank portion of the insole. In the construction illustrated in Fig. 1 each of the four operating units adjacent to the toe end of the insole is so constructed that it has no swiveling adjustment, the carrier 30, forming the main portion of the operating unit, being a right angular extension of a post 32 mounted in a standard illustrated as a channel member 34 projecting upwardly from a slide 36 mounted in a T-way in a base plate 38, said T-way extending widthwise of the supported insole. In each of the four operating units adjacent to the heel end of the insole a carrier 40, forming the main portion of the operating unit, is clamped to the upper portion of a post 42 by a headed clamping screw 44 extending widthwise of the insole through a bore in said post. The swiveling adjustment of the operating unit is effected by turning the unit on the axis defined by said bore, and the operating unit is secured in adjusted position by tightening the screw 44. Similarly to the post 32 the posts 42 are mounted for adjustment heightwise of the upper in standards herein illustrated as channel members 62 projecting upwardly from slides 64 mounted in T-ways extending widthwise of the insole in the base plate 38. For simultaneously actuating the four operating units at the right side of the insole 22, as seen in Fig. 1, a hand lever 46 is pivoted at its inner end on a headed screw 48 mounted in an extension 50 of the base plate 38. The hand lever 46 is provided with a longitudinal slot 52 which receives a pin 56 projecting upwardly from the heel end portion of a cam plate 54. The cam plate is slidably mounted upon the upper surface of the base plate 38 and its operating movements are determined and controlled by two headed screws mounted in the base plate, one of said screws being indicated by the numeral 58 in Fig. 1. Said screws extend upwardly from the base plate through parallel diagonal slots 60 in the cam plate 54 extending toewardly to the right, as seen in Fig. 1, the arrangement of said slots being such that the operation of the hand lever 46 in a clockwise direction, as seen in Fig. 1, causes the cam plate 54 to move heelwardly with a component of movement toward the center of the base plate. The cam plate 54 is provided with four parallel diagonal slots 66 extending toewardly to the left, as seen in Fig. 1, and registering respectively with the slides 36 and 64, said slides having pins 68 projecting upwardly into said slots. It will be seen that the advancement of said slides is the combined result of a movement of translation of the cam plate 54 to the left, as seen in Fig. 1, combined with the cam action of said plate on the pins 68. The four operating units at the left of the insole are actuated by movement of a hand lever 70 in a counterclockwise direction, as seen in Fig. 1, said hand lever actuating a cam plate 72 corresponding to the cam plate 54. The cam plate 72, similarly to the cam plate 54, receives a movement of translation from the actuation of the hand lever 70 and exerts a cam action on the slides through pin-and-slot connections corresponding to those above described.

While the construction and arrangement of the eight operating units differ in some respects by reason of the edge curvatures and longitudinal contour of the insole, they all function in the same manner, and a description of the construction and operation of one of said units will suffice to explain the operation of the entire group. In Figs. 2 and 3 there is illustrated in detail one of the operating units at the left side of the insole—being the unit indicated by the numeral 88 in Fig. 1. Referring to Fig. 3, said operating unit comprises a carrier 74 constructed as a right angular extension of a post 76, said carrier having longitudinal grooves 78 in opposite sides thereof which result in a T-shaped structure complemental to a T-shaped groove 80 in a slide 82. When the slide is assembled on the carrier a spring 84 surrounding a pin 86 mounted in the post 76 and arranged beneath and in parallel relation to the carrier 74, constantly urges the slide 82 to the right, as seen in Fig. 3, thus performing two functions: first, causing the margin of the upper to be gripped between jaws comprising surfaces 90 formed on the slide and a downturned flange 92 formed in an arcuate plate 94 secured to the end face of the carrier 74 by a headed screw 96; and, secondly, causing the arcuate edge face 98 of the slide 82 to engage that portion of the upper contiguous to its overwiping margin and press it against the edge face of the insole thereby to hold the upper against heightwise displacement after the upper gripping devices have opened. When the machine is at rest the flange 92 of the plate 94 limits the movement of the slide 82 and retains the operating unit in its assembled position, as illustrated in Fig. 1. The outturned horizontal portion 100 of the plate 94 serves as a means for gaging the position of the upper heightwise thereof relatively to the insole, the edge of the upper being moved upwardly into contacting relation to said horizontal portion, as illustrated in Fig. 1. In order to insure the maintenance of the heightwise position of the upper relatively to the insole throughout their entire length the slide 82 and the slides included in the other seven operating units have laterally extending portions 102, as shown in Fig. 3, which serve to extend the arcuate upper pressing surface 98 of the slide. The upper pressing surface of the slide 82 together with the corresponding upper pressing surfaces in similar slides included in the other operating units apply pressure to substantially the entire extent of the margin of the upper and insure the retention of said margin in correct position, both lengthwise and heightwise thereof for the overwiping operation. In the operating unit illustrated in Figs. 2 and 3 the margin of the upper is wiped inwardly over the rabbeted margin of the insole by three wiping elements comprising an end face 104 of the carrier 74 and two downward extensions 106 of the plate 94. The post 76 is so adjusted vertically that the wiping elements cause the overwiping margin of the upper to be forced against the rabbeted portion 24 of the insole with sufficient pressure to cause the upper to adhere to the insole (Fig. 2). Referring to Fig. 4, the operating units and particularly the plate 94 and the corresponding plates in the other operating units are so oriented that they define quite accurately the outline of the opposite side portions of an insole mounted in the machine. The units at each side of the machine are uniformly spaced from the edge face of the insole to cause them to operate simultaneously thus to insure a continuous and uniform overwiping of the margin of the upper throughout its entire extent. The operation of said units is illustrated in Figs. 6, 7 and 8. In Fig. 6 the slide 82 has been manually retracted by the operation of a bell crank lever 108 fulcrumed on a cross pin 110 mounted in an upward extension 112 of the carrier 74. The upper portion of said bell crank lever, as shown in Fig. 9, is in the form of an inverted U the parallel portions of which engage opposite side faces of the extension 112 and position the bell crank lever laterally thereon. The downwardly extending portion of the bell crank lever is slotted to receive a pin 116 projecting outwardly from the base portion of the slide 82. As shown in Fig. 6, the operator applies downward pressure to the bell crank lever to swing it in a clockwise direction, thereby to cause the slide 82 to be moved to the left compressing the spring 84. The movement of the slide 82 to the left as above described causes the elements comprising the upper engaging jaws to move away from each other to permit the upper 20 to be moved upwardly into contact with the upper gaging portion 100 of the plate 94. After the upper has been so located the operator releases the pressure upon the bell crank lever 108 whereupon the spring 84 moves the slide 82 to the right into its position illustrated in Fig. 7 in which the upper is gripped and supported against downward movement. After the margin of the upper has been inserted into each one of the eight operating units and gripped therein, as shown in Fig. 7, the hand levers 46 and 70 (Fig. 1) are operated to advance the eight operating units. During the first stage of the advancement of said units the opposite margins of the upper are moved toward each other and gripped against the edge face of the insole by the upper pressing surface of the slide 82 and like upper pressing surfaces of the slides in the other seven operating units. In the second stage of the advancement of said operating unit the carrier 74 moves relatively to the slide 82 to open the upper gripping jaws. During the third and final stage of the advancement of the operating units continued movement of the carrier 74 to the right as seen in Fig. 8 causes the wiping elements 104 and 106 to wipe the bottom margin of the upper inwardly over the rabbeted portion of the insole.

In the illustrated machine an insole, such, for example, as the insole 22 illustrated in Fig. 1, is mounted in predetermined relation to the operating units upon a forepart plate 118 (Figs. 4 and 5) and a shank plate 120. The shank plate is secured to a vertical post 122 slidably mounted in a crosshead 124 secured to the base plate 38 by pins 123, said post extending upwardly through an opening provided in the base plate. For mounting the shank plate 120 on the post 122 said post has a ball headed screw 125 mounted in its upper portion and arranged at an angle thereto such that it is disposed in substantially perpendicular relation to the shank plate 120, as shown in Fig. 5. The head of the screw 125 is clamped between two blocks having mutually registering recesses which receive the head of the screw, one of said blocks being indicated by the numeral 126 in Fig. 5. The blocks are mounted in a U-shaped bracket 127 which is welded to the bottom surface of the plate 120. The block 126 is freely mounted relatively to the bracket and the block which is not illustrated is welded to the bracket. A headed clamping screw 129 extends through bores in one side of the bracket 127 and in the block welded thereto and has threaded engagement with the free block 126. By tightening the screw 129 the blocks are securely clamped against the ball head of the screw 125.

The forepart plate 118 has a ball headed screw 128 secured thereto and projecting downwardly therefrom, said screw being mounted in a socket formed by mutually registering recesses in members 130 and 131 secured by a clamping screw 133 to the upper end portion of an arm 132 and to the ball head of screw 128. The upper portion of said arm is rectangular in cross section and is positioned in a channel 139 formed in the member 131 which channel also receives a tail portion 137 of the member 130. The lower portion of the arm 132 is positioned in a slot in the crosshead 124 and is pivotally mounted on a cross pin 134 fixed in the crosshead and extending through said slot. The central portion of the arm 132 extends through a slot in the post 122 the upper and lower limits of which are indicated in Fig. 10 by the lines 141 and 143 respectively. The angular position of the arm 132 in the various positions of the post 122 is determined by a cross pin 136 fixed in the opposite side portions of the post and extending through a slot 138 in an enlarged portion of the arm, said slot being so constructed that upward movement of the post 122 causes the arm to swing in a counterclockwise direction as seen in Fig. 5, thus moving the forepart plate 118 into a position beneath the shank plate 120 as shown in Fig. 10.

The insole supporting plates are normally arranged in their relative position illustrated in Fig. 5 in which they are retained by a spring 135 acting on said post. In this position the plates are arranged to receive an insole and to locate it accurately for assembly with an upper. To facilitate the insertion of an upper into the machine the insole supporting plates are moved into their offset position relatively to each other as illustrated in Fig. 10 by the depression of a treadle 140 connected by a link 142 to the lower end of the post. It will be seen that in this position of the plates their overall length is substantially reduced and both the forepart plate and the shank plate have been elevated. Consequently, said plates will offer the least possible interference to the insertion of the upper into the machine and the introduction of its overwiping margin into the gripper jaws of the operating units. After the upper has been so inserted into the machine and after its overwiping margin has been engaged by the gripper jaws of the operating units the operator takes his foot off the treadle 140 and permits the post 122 to be returned by the spring 135 to its position illustrated in Fig. 5 in which position said plates are arranged to receive an insole. An insole such, for example, as the insole 22, illustrated in Fig. 1, is then placed upon the plates 118 and 120 with its rabbeted portions facing upwardly. The insole is located lengthwise thereof on said plates by bringing the edge of its toe portion into contact with the upturned end portion of a gage plate 144 (Fig. 5) mounted beneath the plate 118. The toe portion of the insole is positioned widthwise thereof on the plate 118 by bringing a match mark at the center of its toe end portion into registration with an indicator in the form of a V-shaped extension 145 (Fig. 1) of the upturned portion of the gage plate 144. After the insole is so located on its supporting plates a suitable clamping member is brought into engagement therewith to press it against said supporting plates and hold it securely in its position thereon while an upper is assembled thereon. The illustrated insole clamping member is a bent rocker member 146 (Figs. 1 and 5) having at its forward end a presser foot 148 which clamps the forepart of the insole against the plate 118, and having at its rearward end a similar presser foot 150 which presses the shank portion of the insole against the plate 120. The rocker member 146 is freely mounted on a bolt 152 mounted in the bifurcated end portion of an arm 154 and oriented for engagement with the insole by its engagement with said arm at the base 155 of the opening between the bifurcations. The arm 154 is pivotally mounted on the reduced end portion of an arm 156 and is yieldingly held at the limit of its counterclockwise movement, as seen in Fig. 5, by a spring pressed plunger 157. The lower end portion of the arm 156 is positioned between parallel ears 158 projecting from a bracket 159 secured to the crosshead 124 and is pivotally mounted on a crosspin 160 mounted in said extensions and passing through a slot 162 formed in the enlarged end portion of the arm 156. When the clamping member is in its retracted position illustrated in Fig. 5 the cross pin 160 is in the right end of the slot as seen in said figure and the slot inclines downwardly from the cross pin, its position being determined by the engagement of a pin 166 in the end portion of the arm 156 with the bottom edge faces of the ears 158. In the operation of the insole clamping member the arm 156 is swung in a clockwise direction as seen in Fig. 5 until such movement is arrested by the engagement of a projection 168 formed in the lower portion of the arm 156 with the upper surface of the crosshead 124. The flat bottom surface of the projection 168 is parallel to the longitudinal axis of the slot 162, and the projection 168 is so disposed with relation to the upper surface of the crosshead 124 that its flat bottom surface is horizontal when it is in contact with the crosshead. After moving the arm 156 to the limit of its clockwise movement the insole clamping assembly is moved bodily to the right as seen in Fig. 5 to bring the then vertical surface 170 of the end portion of the arm 156 into abutting engagement with the vertical edge face 172 of the bracket 159 and to bring a short projection 174 at the lower end of the arm 156 into engagement with the bottom of the bracket thereby to hold the insole clamping assembly securely against counterclockwise movement. Upon the completion of such bodily movement of the insole clamping assembly the presser feet 148 and 150 are positioned over the insole and are spaced therefrom a fraction of an inch. The presser feet are now moved vertically downwardly into clamping engagement with the insole by swinging the arm 154 upon its pivotal connection with the arm 156. Such movement of the arm is effected by manual operation of a toggle mechanism comprising a link 176 pivoted to an angular extension 178 of the arm 156 and a toggle link 180 pivoted to an angular extension 182 of the arm 154. For operating the toggle mechanism a handle 184 is provided, said handle being a channel member within which the toggle links and portions of the extensions 178 and 182 are all located when the toggle links are in their straightened position. For pivotally mounting the handle on the extension 182 the pin 186 which connects the toggle link 180 to the extension 182 is extended in both directions to pass through alined holes in the opposite side portions of the handle. Similarly the pin 188 which connects the two toggle links together is extended in both directions to pass through alined holes in the opposite side portions of the handle. These holes are so located that the lower portion of the link 180 is spaced slightly from the inner surface 190 of the handle 184 so that the toggle links pass slightly beyond their dead center position during movement of the handle in a counterclockwise direction, as seen in Fig. 5, such movement terminating when the lower portion of the surface 190 of the handle abuts the end of the extension 178. It will be understood that inasmuch as the toggle links have passed slightly beyond their dead center position when the handle abuts the extension 178 the pressure created by the operation of the toggle link will retain them in their operative position until the operator manually releases the toggle links by a clockwise movement of the handle. In retracting the insole holddown member after the operation of the machine has been completed the operator first swings the handle 184 in a clockwise direction to release the pressure of the presser feet 148 and 150 upon the insole and then moves the holddown mechanism bodily in a horizontal direction until the pin 160 is located in the right end of the slot 162 as seen in Fig. 5. The entire assembly is then swung in a counterclockwise direction upon the pin 160 until it comes to rest with the pin 166 abutting the extensions 158.

In order to provide for the mounting of insoles of different sizes upon the plates 118 and 120 the gage plate 144, which determines the position of the insole lengthwise thereof on the supporting plates, is mounted for sliding movement longitudinally of the plate 118 between suitable gibs secured to and extending downwardly from said plate, one of said gibs being indicated by the numeral 192 in Fig. 5. In order to secure the gage plate in adjusted position an arm 194 is pivotally mounted on a cross pin 196 mounted in the gibs 192 and is so arranged with relation to the gage plate that a slight motion of the arm in a counterclockwise direction, as seen in Fig. 5, causes the right end of said arm to exert a binding action on the gage plate. Such counterclockwise movement of the arm is effected by a spring 198 mounted in a notch formed in the free end portion of the arm and arranged to bear against a plate 200 fixed to the gibs.

Figure 11:
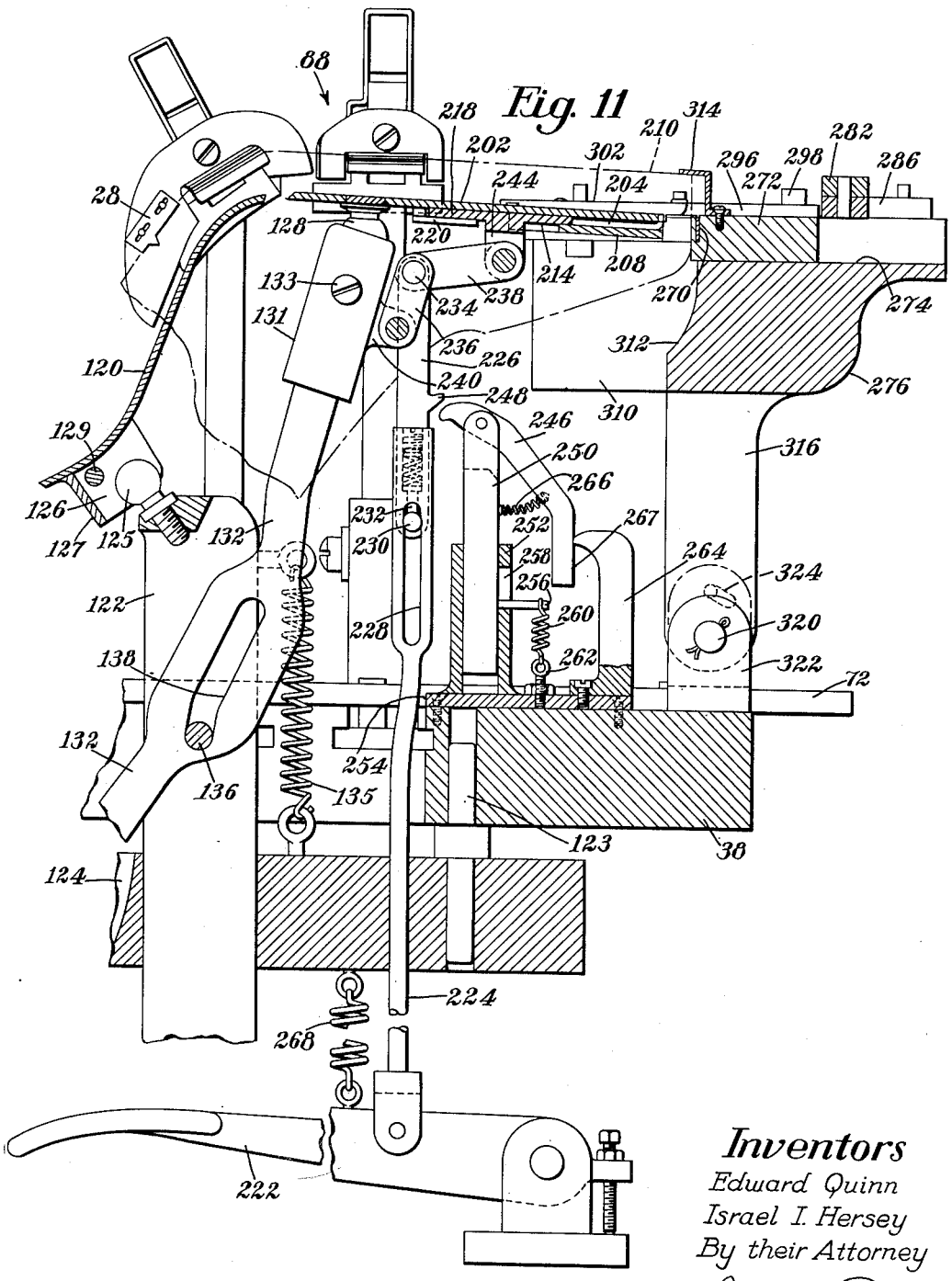
Fig. 11 is a sectional elevation, taken on the same plane as Fig. 5, illustrating a modified construction of the machine illustrated in Fig. 1 constructed and arranged to assemble uppers and insoles of shoes having closed toes and open heels.

The machine illustrated in Figs. 11 to 14 inclusive is the same in its construction and operation as the machine above described except that there are only three operating units at each side of the machine. The two operating units at the toe end are omitted and in their place the modified machine is provided with mechanism for operating on the toe portion of an upper having a closed toe, the means above described for gaging the position of the toe end of an insole being omitted and other means for this purpose being provided. Said machine is provided with means for shortening the linear dimension of the overwiping margin at the toe portion of the upper and bringing it into abutting relation to the edge face of the insole so that the overwiping margin may be wiped in over the margin of the toe portion of the insole. Referring to Figs. 11 to 14 inclusive illustrating the mechanism for operating on the toe portion of the upper, the illustrated machine is provided with a plate 202 constructed and arranged to support the forepart of an insole. Said plate is mounted in the same manner as the plate 118 hereinbefore described. The edge face 203 (Fig. 14) at the toe end portion of said plate 202 is set back slightly as shown in Fig. 14 to provide space for the upturned heads of a plurality of sliding pins 204, the depth of said recess being substantially equivalent to the thickness of the heads of said pins so that said heads in their position illustrated in Fig. 13 define a line which is substantially a continuation of the edge of that portion of the plate 202 extending heelwardly from said pins. The stems of the pins 204 are substantially square in cross section and are slidably mounted in grooves 206 (Fig. 14) formed in a plate 208 secured to the bottom surface of the plate 202. The grooves 206 diverge outwardly, as shown in Fig. 14, the arrangement being such that the terminal groove on each side of the plate is arranged in substantially perpendicular relation to the edge of the insole supporting plate 202 while the intermediate pins are so arranged relatively to each other that their heads are spaced apart uniformly when the pins are extended, as shown in Fig. 14 and are arranged in substantially contiguous relation to each other in their retracted position shown in Fig. 13. In the operation of the machine the heads of the pins 204 engage the inner surface of the toe portion of an upper such for example as the upper 210 illustrated in Figs. 13 and 14 along a line substantially contiguous to the overwiping margin of the upper. In order to obviate any pinching of the upper by the heads of the pins as they approach each other during their retracting movement, the heads of alternate pins have secured thereto thin plates 212. The dimension of each of said plates heightwise of the upper corresponds to the same dimension of the heads of the pins but their dimension in the direction of the periphery of the upper is substantially double the corresponding dimension of the heads of the pins and said plates are so arranged that their end portions extend slightly over the heads of the adjacent pins when the pins are in their extended position illustrated in Fig. 14, and in the retracted position of the pins illustrated in Fig. 13 the ends of said plates lie substantially contiguous to one another. The plates 212 are made of very thin material so that they will have no appreciable tendency to exert a pinching action on the inner surface of the upper. For simultaneously moving the pins 204 from their retracted position illustrated in Fig. 13 to their extended position illustrated in Fig. 14 the illustrated machine is provided with a plate 214 which is positioned within a recess formed in the plate 208, the wall of said recess being indicated by the line 216 in Figs. 13 and 14. The depth of said recess is the same as the depth of the grooves 206 in the plate 208, and said recess provides a sliding fit for the plate 214 between the bottom of the plate 202 and the plane surface forming the base of said recess. That edge face of the plate 214 which engages the inner ends of the pins 204 has a curvature complemental to the curvature defined by the ends of said pins in their retracted position illustrated in Fig. 13. The plate 214 advances toewardly in a rectilinear path to operate the pins 204, said path being determined by the engagement of a heelwardly extending shank portion 218 of the plate 214 with gibs formed in a plate 220 secured to the bottom surface of the insole supporting plate 202. The plate 214 is moved toewardly to operate the pins 204 by the depression of a treadle 222 (Fig. 11) having pivotally connected thereto a link 224. The bifurcated upper portion of the link 224 is provided with slots 228 into which extend the end portions of a cross pin 230 mounted in the lower end portion of a link 226. The link 224 actuates the link 226 through headed, spring-pressed plungers 232 arranged to engage the cross pin 230. The link 226 is pivoted at its upper end on a pin 234 which forms the connection between two toggle links 236 and 238, the former being pivotally mounted on a lug 240 on the member 131 and the latter being pivotally connected to lugs 244 extending downwardly from the plate 214. The pins 204 are advanced into their position in Fig. 14 by depressing the treadle 222 and are yieldingly held in said position by a detent 246 constructed and arranged to engage a tooth 248 formed in the link 226. The detent is herein illustrated as an arm pivotally mounted in the bifurcated upper end portion of a rod 250, slidably mounted in a tube 252 secured to a plate 254 fixed to the base plate 38, said rod being held against rotation in the tube by a pin 256 extending through a vertical slot 258 in the tube. The rod 250 is yieldingly held against upward movement by a spring 260 one end of which engages the pin 256 and the other end of which is hooked to a screw eye 262 in the plate 254. It will be seen that the tension of the spring 260 yieldingly holds the pins 204 in their extended position after the treadle has been released and determines the degree of pressure imparted by said pins to the inner surface of the upper. In order to hold the detent 246 against swinging movement in a counterclockwise direction as seen in Fig. 11, when the tooth 248 strikes the detent in the course of its downward movement an abutment member 264 is secured to the plate 254 and arranged to engage the tail portion of the detent. A spring 266 urges the tail portion 267 of the detent against said abutment member to hold the detent in its operative position illustrated in Fig. 11. During the downward movement of the links 224 and 226 the engagement of the beveled bottom surface of the tooth 248 with the upper surface of the detent causes said links to swing out of alinement in the direction of the heel end of an upper in the machine to permit the tooth 248 to move by the detent. After the tooth has cleared the detent, the pressure on the treadle causes the links 224 and 226 to come into alinement again with the tooth 248 positioned beneath the detent. With the operating parts in this position the upper engaging pins 204 are yieldingly held in their extended position by the action of the spring 260. When the operation on the toe portion of the upper has been completed and the margin of the upper has been wiped inwardly over the margin of the insole and cement attached thereto the operator manually swings the detent 246 in a clockwise direction, as seen in Fig. 11, to permit the slide 250 and the detent 246 to be returned to their rest position shown in Fig. 11 by the contraction of the spring 260.

For cooperating with the upper engaging pins 204 to shorten the linear dimension of the toe portion of the upper, an upper engaging band is arranged to embrace the toe portion of the upper, as shown in Figs. 12, 13 and 14. The central portion of the band 270 is seated in a notch in the end portion of a slide 272 mounted in a groove 274 formed in a head 276. The slide 272 is freely mounted in said groove and its only function is to position the central portion of the band 270 in predetermined relation to the supported upper heightwise thereof. The opposite end portions of the band 270 are anchored to the inturned end portions of two slides 278 and 280 mounted in grooves in the head 276 parallel to the groove 274. For advancing the slides 278 and 280 to cause the band 270 to move in the direction of the heel end of the upper a hand lever 282 is fulcrumed on a pin 284 projecting upwardly from the head 276 and has a pin-and-slot connection to the slide 280. The left end portion of the hand lever 282 has a pin-and-slot connection to a lever 286 fulcrumed on a pin 288 projecting upwardly from the head 276, said lever having a pin-and-slot connection to the slide 278. The pins 284 and 288 are equally spaced from the pivotal connection of the levers 282 and 286 to each other and are likewise equally spaced from the slides 278 and 280 so that said slides receive equal movement toward the heel end of the upper by a swinging movement of the hand lever 282 in a clockwise direction as seen in Fig. 12. In order to cause the band 270 to shorten the linear dimension of the toe portion of the upper the terminal pins 204 at each side of the upper are provided with toothed heads 290, and slides 292 are constructed and arranged to force the band inwardly thereby to press opposite side portions of the upper against said heads 290 at an early stage in the advancement of the band. The slides 292 are mounted respectively in grooves 294 formed in the head 276, said grooves being substantially perpendicular lengthwise thereof to the periphery of those portions of the upper adjacent to said grooves. To obviate interference between the band 270 and the slides 292 said slides are notched to permit the band to slide through their respective end portions. For actuating the slides 292 two arms 296 are pivotally mounted on pins 298 projecting upwardly from the head 276 and are arranged to engage pins 300 projecting upwardly from said slides. For actuating said arms to advance the slides, two levers 302 are positioned at opposite sides of the toe portion of the supported upper and fulcrumed on pins 304 projecting upwardly from the head 276, the respective tail portions of said levers being connected by springs 306 to the free end portions of the arms 296. The free end portions of the levers 302 are provided with downturned flanges 308 constructed and arranged to be engaged by the inturned end portions of the slides 278 and 280 during the initial stage of their advancement thereby swinging said levers from their position illustrated in Fig. 13 into their position illustrated in Fig. 12, and causing the slides 292 to force opposite side portions of the upper into gripping engagement with the toothed heads 290 of the terminal pins 204. During the initial advancement of the slides 278 and 280 the tail portions of the levers 302 move away from the arms 296 thereby energizing the springs 306. During the operation of the band 270 the energy thus imparted to said springs causes the arms 296 to maintain a continuing pressure upon the slides 292 as the pins 204 are moved inwardly from their position in Fig. 14 to their position in Fig. 13, thereby maintaining the gripping action of the slides 292 and the toothed heads 290 upon the opposite side portions of the upper. In the operation of the machine the spring 260 (Fig. 11) operating on the detent carrying slide 250, yieldingly urges the pins 204 outwardly into their extended position illustrated in Fig. 14 while the actuation of the hand lever 282 advances the band 270. Thus the entire margin of the toe portion of the upper is yieldingly engaged and pressed between the pins 204 and the band 270 and this pressure is maintained during the advancement of the band from its position illustrated in Fig. 14 into its position illustrated in Fig. 12. Inasmuch as the tip line portion of the margin of the upper is confined between the band and the toothed heads 290 of the terminal pins 204 because of the gripping action exerted on the upper by the slides 292, and the gripping action thus exerted on the upper prevents lengthwise movement of the upper relatively to the heads 290, the combined action of the band and the pins 204 causes the linear dimension of the toe portion of the upper to be shortened from its initial length as it appears in Figs. 13 and 14 to its shortened length as it appears in Fig. 12.

Inasmuch as the band 270 and the pins 204 maintain a substantial pressure upon the margin of the upper during the shortening operation, there is no possibility of the occurrence of wrinkles or pleats in the margin of the upper during the shortening operation. In order to provide clearance for the toe portions of the upper and insole and for the toe end portion of the insole supporting plate 202 and the operating mechanism mounted thereon, the head 276 has formed therein a generally rectangular recess indicated by the line 310 in Fig. 12. As shown in Fig. 11, said recess extends the full height of the head 276 and its wall 312 is cut back on a curved line so that the upper extremity of said wall is set back slightly from the end of the slide 272 when said slide is in its retracted position illustrated in Fig. 11. For gaging the heightwise position in the machine of the toe end portion of the upper 210 an angle piece 314 is secured to the end portion of the slide 272, said angle piece having a horizontal extension arranged to engage the edge of the overwiping margin of the upper and spaced above the plane of the insole to the extent of the desired width of said overwiping margin. In order to facilitate the insertion of the toe portion of the upper into its position in the machine, as indicated by broken lines in Fig. 11, the head 276 is mounted for movement away from its operative position. In the illustrated construction the head 276 has downwardly extending arms 316 and 318 (Figs. 11 and 13) the lower end portions of which are freely mounted on pins 320 mounted in ears 322 projecting upwardly from the base plate 38. In order to retain the head 276 in its operating position a pin 324 (Fig. 13) is inserted through holes provided in the ears 322 and the arm 318, said holes being in alinement with each other when the head 276 is in its operating position.

In the operation of the machine illustrated in Fig. 11 the pin 324 is retracted and the head 276 is swung forwardly, and the treadle 149 (Fig. 10) is then actuated to move the insole supporting plates into their disassembled position illustrated in Fig. 10 to facilitate the introduction of the upper into the machine. The upper 210 is then introduced into the machine and its forepart and shank portion are positioned heightwise thereof by bringing them into contact with the horizontal portion of the jaw 92 (Fig. 6) and the corresponding portion of similar jaws in the other operating units. It will be understood that the bell crank lever 108 is manually operated as shown in Fig. 6 to bring the jaw 92 into position to receive the margin of the upper, and after the upper has been positioned relatively to said jaw the pressure on the bell crank lever is released to permit the jaws to close on the upper. The upper is located lengthwise thereof in the machine by bringing match marks in its edge portion into registration with the indicator plates provided for that purpose. After the upper has been located in the gripper jaws the head 276 is moved upwardly into its operating position illustrated in Fig. 11 and the pin 324 is inserted to retain it in said position. The insole supporting plates are now returned to their insole supporting position and an insole is then mounted on said plate. In the construction illustrated in Fig. 5 the toe end portion of the insole is positioned lengthwise and widthwise with relation to a gage plate 144. In the construction illustrated in Fig. 11 said gage plate is necessarily omitted and the insole is located with relation to the central plate 212 which at this time is located in its retracted position illustrated in Fig. 13. If desired, this plate may be notched so as to provide a gage mark to register with a corresponding notch in the toe end of the insole. The pins 204 are advanced into their extended position illustrated in Fig. 14 and the hand lever 282 (Fig. 13) is operated to move the band 270 heelwardly to cause the margin of the toe portion of the upper to be shortened as hereinbefore described. The hand levers 46 and 70 (Fig. 4) are now operated to actuate the operating units at opposite sides of the upper thereby to wipe the margin of the upper in over the margin of the insole and cement attach it thereto. The margin of the toe portion of the upper is then wiped inwardly and cement attached to the margin of the insole. The operator will perform this operation with his fingers or with a boning tool or the like, as convenience dictates. If desired, a pinking tool or other suitable means may be employed to cut notches in the margin of the toe portion of the upper to obviate the occurrence of pleats during the overwiping operation.

After the overwiping operation has been completed about the entire extent of the periphery of the upper and the upper attaching cement has set sufficiently to retain the upper in its overwiped position, the wiping mechanism is retracted. The detent 246 is then manually disengaged from the tooth 248 to relieve the pressure upon the pins 204 and the toe band 270 is then retracted whereupon the head 276 is swung downwardly into its inoperative position and the shoe is removed from the machine.

While this description of operation has reference mainly to the machine illustrated in Fig. 11, which operates on an upper having a closed toe, it is believed that the operation of the machine illustrated in Fig. 1 which operates on uppers having open toes will be fully comprehended from the above description.

Having thus described our invention, what we claim as new and desire to secure by Letters Patent of the United States is:

1. In a machine for assembling an insole and a prefitted upper having a closed toe and an overwiping margin, means located in the space between the sides of an inverted upper in the machine and spaced from the inner surface of the upper for mounting an insole, means for gripping the overwiping margin of the upper from the forepart heelwardly at opposite sides thereof, means for operating said gripping means to bring the overwiping margin of the upper into engagement with the edge face and the bottom margin of the insole, and means for shortening the toe portion of the overwiping margin thereby to reduce its length to correspond to the length of the edge face of the toe portion of the insole.

2. In a machine for assembling an insole and a prefitted upper having a closed toe and an overwiping margin, means spaced from the inner surface of the upper for mounting an insole, means for gripping the overwiping margin of the upper from the forepart heelwardly at opposite sides thereof, said gripping means including means for determining the position of the overwiping margin heightwise of the upper relatively to the insole, means for operating said gripping means to bring the overwiping margin of the upper into engagement with the edge face of the insole and to wipe said margin inwardly over the margin of the insole, and means for shortening the toe portion of the overwiping margin thereby to reduce its length to correspond to the length of the edge face of the toe portion of the insole.

3. In a machine for assembling an insole and a prefitted upper having a closed toe and an overwiping margin, means spaced from the inner surface of the upper for mounting an insole, a plurality of grippers constructed and arranged to engage the overwiping margin of the upper from the forepart heelwardly at opposite sides of the shoe, means for simultaneously operating said grippers first to bring the overwiping margin into engagement with the edge face of an insole mounted in the machine, and secondly to wipe said margin inwardly over the margin of the insole, and means for shortening the toe portion of the overwiping margin thereby to reduce its length to correspond to the length of the edge face of the toe portion of the insole.

4. In a machine for assembling an insole and a prefitted upper, a plurality of operating units each comprising a pair of relatively movable jaws constructed and arranged to engage the overwiping margin of an upper, means constructed and arranged to abut that portion of the upper contiguous to the edge face of the insole, said abutting means being integral with one of said jaws, and a wiping means which is integral with the other of said jaws.

5. In a machine for assembling an insole and a prefitted upper, a plurality of operating units each comprising relatively movable members having jaws constructed and arranged to engage the overwiping margin of an upper, an element formed in one of said members and constructed and arranged to abut that portion of the upper contiguous to the edge face of the insole, and a wiping element formed in another of said members.

6. In a machine for assembling an insole and a prefitted upper, means spaced from the inner surface of the upper for mounting an insole, relatively movable work engaging jaws constructed and arranged to engage the overwiping margin of an upper, an abutting member constructed and arranged to engage that portion of the upper contiguous to the edge face of the insole thereby to arrest only one of said jaws, and an overwiping member movable relatively to said abutting member.

7. In a machine for assembling an insole and a prefitted upper, means spaced from the inner surface of the upper for mounting an insole, relatively movable work engaging jaws constructed and arranged to engage the overwiping margin of the upper, an abutting member constructed and arranged to engage that portion of the upper contiguous to the edge face of the insole thereby to arrest only one of said jaws, an overwiping member movable relatively to said abutting member, means for yieldingly advancing said abutting member, and means for positively advancing said wiping member.

8. In a machine for assembling an insole and a prefitted upper, means spaced from the inner surface of the upper for mounting an insole, relatively movable work engaging jaws constructed and arranged to engage the overwiping margin of the upper, an abutting member constructed and arranged to engage that portion of the upper contiguous to the edge face of the insole thereby to arrest only one of said jaws, an overwiping member movable relatively to said abutting member, means for yieldingly advancing said abutting member and maintaining a continuous pressure thereof against the upper during the overwiping operation, and means for positively actuating said overwiping means.

9. In a machine for assembling an insole and a prefitted upper, a plurality of operating units each comprising a carrier and a slide, a pair of upper engaging members which consist of a jaw on said carrier and a jaw on said slide, an abutting member on said slide constructed and arranged to press the upper against the edge face of the insole, and a wiper on said carrier constructed and arranged to wipe the margin of the upper in over the insole.

10. In a machine for assembling an insole and a prefitted upper, a plurality of operating units each comprising a carrier and a slide, a pair of upper engaging members which consist of a jaw on said carrier and a jaw on said slide, an abutting member on said slide constructed and arranged to press the upper against the edge face of the insole, a wiper on said carrier constructed and arranged to wipe the margin of the upper in over the insole, said jaws being so constructed and arranged relatively to the upper wiping means that they open to some extent before the beginning of the overwiping movement of the wiping means.

11. In a shoe machine, work supporting means constructed and arranged to support an insole off the last, mutually cooperating jaws constructed and arranged to engage the bottom margin of an upper and support it in a predetermined relation to the insole such that a predetermined wiping margin of the upper projects upwardly from the plane of the insole, means for advancing the jaws into a position in which the upper engages the edge face of the insole, and means for pressing the upper against the edge face of the insole to hold it against heightwise displacement after the jaws have opened.

12. In a shoe machine, work supporting means constructed and arranged to support an insole off the last, mutually cooperating jaws constructed and arranged to engage the bottom margin of an upper and support it in a predetermined relation to the insole such that a predetermined wiping margin of the upper projects upwardly from the plane of the insole, means for closing the jaws, and means for advancing the closed jaws into a position in which the upper engages the edge face of the insole, one of said jaws having an extension which provides a surface constructed and arranged to engage the upper and press it against the edge face of the insole thereby to hold the upper against heightwise displacement after the jaws have opened.

13. In a shoe machine, work supporting means constructed and arranged to support an insole off the last, mutually cooperating jaws constructed and arranged to engage the bottom margin of an upper and support it in a predetermined relation to the insole such that a predetermined wiping margin of the upper projects upwardly from the plane of the insole, means for advancing the jaws into a position in which the upper engages the edge face of the insole, means for pressing the upper against the edge face of the insole to hold it against heightwise displacement after the jaws have opened, and means for wiping the margin of the upper in over the margin of the insole.

14. In a shoe machine, work supporting means constructed and arranged to support an insole off the last, mutually cooperating jaws mounted in predetermined relation to said work supporting means and arranged for gripping engagement with the bottom margin of an upper, a carrier on which one of said jaws is mounted, a slide mounted on said carrier and having formed thereon the other of said jaws, said slide having a surface constructed and arranged to press the upper against the edge face of an insole mounted on said work supporting means, and means formed on said carrier for wiping said bottom margin inwardly over the margin of the insole.

15. In a shoe machine, work supporting means constructed and arranged to support an insole off the last, mutually cooperating jaws mounted in predetermined relation to said work supporting means and arranged for gripping engagement with the bottom margin of an upper, a carrier on which one of said jaws is mounted, a slide mounted on said carrier and having formed thereon the other of said jaws, said slide having a surface constructed and arranged to press the upper against the edge face of an insole mounted on said work supporting means, a wiping surface on said carrier for wiping said bottom margin inwardly over the margin of the insole, and a spring interposed between the carrier and the slide for actuating said gripper jaws.

16. In a shoe machine, work supporting means constructed and arranged to support an insole off the last, mutually cooperating jaws mounted in predetermined relation to said work supporting means and arranged for gripping engagement with the bottom margin of an upper, a carrier on which one of said jaws is mounted, a slide mounted on said carrier and having formed therein the other of said jaws, said slide having a surface constructed and arranged to press the upper against the edge face of an insole mounted on said work supporting means, a wiping surface formed on said carrier for wiping said bottom margin inwardly over the margin of the insole, a spring interposed between the carrier and the slide for actuating said gripper jaws, and means for advancing the carrier to wipe said bottom margin of the upper in over an insole.

17. In a shoe machine, work supporting means constructed and arranged to support an insole off the last, mutually cooperating jaws mounted in predetermined relation to said work supporting means and arranged for gripping engagement with the bottom margin of an upper, a carrier on which one of said jaws is mounted, a slide mounted on said carrier and having formed thereon the other of said jaws, said slide having a surface constructed and arranged to press the upper against the edge face on an insole mounted on said work supporting means, a wiping surface formed on said carrier for wiping said bottom margin inwardly over the margin of the insole, a spring interposed between the carrier and the slide for actuating said gripper jaws, and means for advancing the carrier first to cause the upper to be pressed against the edge face of an insole and thereafter to cause the bottom margin of the upper to be wiped in over the margin of the insole.

18. In a shoe machine, work supporting means constructed and arranged to support an insole off the last, mutually cooperating jaws mounted in predetermined relation to said work supporting means and arranged for gripping engagement with the bottom margin of an upper, a carrier on which one of said jaws is mounted, a slide mounted on said carrier and having formed thereon the other of said jaws, said slide having a surface constructed and arranged to press the upper against the edge face of an insole mounted on said work supporting means, a wiping surface formed on said carrier for wiping said bottom margin inwardly over the margin of the insole, a spring interposed between the carrier and the slide for actuating said gripper jaws, and means for advancing said carrier first to cause the upper to be pressed against the edge face of an insole, then to move the carrier relatively to the slide to cause the jaws to open, and finally, to wipe said bottom margin of the upper in over an insole.

19. In a shoe machine, a carrier having a wiping surface for wiping the bottom margin of an upper over the margin of an insole, a gripper jaw mounted on said carrier, a slide mounted on said carrier, said slide having a surface serving as a gripper jaw constructed and arranged to cooperate with the first-mentioned gripper jaw, said slide having also a surface constructed and arranged to press an upper against the edge face of an insole, a spring interposed between the slide and the carrier for closing the gripper jaws, and a lever fulcrumed on the carrier and connected to the slide for operating said slide to open the gripper jaws.

20. In a shoe machine, a carrier having a wiping surface for wiping the bottom margin of an upper over the margin of an insole, a gripper jaw mounted on said carrier, a slide mounted on said carrier, said slide having a surface serving as a gripper jaw constructed and arranged to cooperate with the first-mentioned gripper jaw, said slide having also a surface constructed and arranged to press an upper against the edge face of an insole, a spring interposed between the slide and the carrier for closing the gripper jaws, and means operable manually to retract the slide thereby to open the gripper jaws.

21. In a shoe machine, work supporting means constructed and arranged to support an insole off the last, a carrier constructed and arranged for movement toward and from said work supporting means, a wiper on said carrier constructed and arranged to wipe the bottom margin of an upper inwardly over the margin of the insole, a post on which the carrier is mounted for adjustment about an axis extending widthwise of the insole, a slide in which the post is mounted for adjustive movement heightwise of the upper, and means for advancing said slide to actuate said wiping means.

22. In a shoe machine, work supporting means constructed and arranged to support an insole off the last, a carrier constructed and arranged for movement toward and from said work supporting means, a wiper on said carrier constructed and arranged to wipe the bottom margin of an upper inwardly over the margin of the insole, a post on which the carrier is mounted for adjustment about an axis extending widthwise of the insole, a slide in which the post is mounted for adjustive movement heightwise of the upper, a cam operatively connected to said slide, and means for operating said cam to actuate said wiping means.

23. In a machine for assembling an insole and a prefitted upper having a closed toe and an overwiping margin, means for supporting an insole off the last, means for shortening the linear dimension of the overwiping margin of the toe portion of the upper comprising a band constructed and arranged to engage the toe portion of an upper off the last, two gripper jaws one at each side of the toe portion of the upper, constructed and arranged to cooperate with said band to grip the overwiping margin of the upper locally at opposite sides of the toe portion, and means for moving the band heelwardly to bring the upper into engagement with the edge face of the insole.

24. In a machine for assembling an insole and a prefitted upper having a closed toe and an overwiping margin, means for supporting an insole, means for shortening the linear dimension of the overwiping margin of the toe portion of the upper comprising a band constructed and arranged to engage the toe portion of the upper, two gripper jaws one at each side of the toe portion of the upper, constructed and arranged to cooperate with said band to grip the overwiping margin of the upper locally at opposite sides of the toe portion, means for moving the band heelwardly to bring the upper into engagement with the edge face of the insole, and a plurality of presser members constructed and arranged to engage the inner surface of the upper and press it continuously against the band as the band is advanced to shorten the overwiping margin of the upper.

25. In a machine for assembling an insole and a prefitted upper having a closed toe and an overwiping margin, means for supporting an insole off the last, means for gripping the overwiping margin of an upper off the last at opposite sides of its toe portion, a band constructed and arranged to engage the toe portion of the upper between the gripping means, and a hand lever for moving the band heelwardly to bring the upper into engagement with the edge face of the insole.

26. In a machine for assembling an insole and a prefitted upper having a closed toe and an overwiping margin, means for supporting an insole, means for gripping the overwiping margin at opposite sides of its toe portion, a band constructed and arranged to engage the toe portion of the upper between the gripping means, a hand lever for moving the band heelwardly to bring the upper into engagement with the edge face of the insole, and a plurality of presser members constructed and arranged to press the upper outwardly against the band.

27. In a machine for assembling an insole and a prefitted upper having a closed toe and an overwiping margin, means for supporting an insole, means for gripping the overwiping margin at opposite sides of its toe portion, a band constructed and arranged to engage the toe portion of the upper between the gripping means, a hand lever for moving the band heelwardly to bring the upper into engagement with the edge face of the insole, a plurality of presser members constructed and arranged to press the upper outwardly against the band, and a supporting member in which said presser members are arranged to project divergently.

28. In a machine for assembling an insole and a prefitted upper having a closed toe and an overwiping margin, means for supporting an insole, means for gripping the overwiping margin at opposite sides of its toe portion, a band constructed and arranged to engage the toe portion of the upper between the gripping means, means for moving the band heelwardly to bring the upper into engagement with the edge face of the insole, a plurality of presser members constructed and arranged to press the upper outwardly against the band, a supporting member in which said presser members are arranged to project divergently, and plates secured to the upper engaging ends of selected presser members and arranged to bridge the space between said presser members and adjacent presser members.

29. In a machine for assembling an insole and a prefitted upper having a closed toe and an overwiping margin, means for supporting an insole, means constructed and arranged for gripping engagement with the inner surface of the upper at opposite sides of its toe portion, a band constructed and arranged to engage the outer surface of the toe portion of the upper, means for pressing the band against the outer surface of those portions of the upper engaged by said gripping means, a member for moving the band heelwardly to bring the upper into engagement with the edge face of the insole, and means actuated by said member for operating said pressing means.

30. In a machine for assembling an insole and a prefitted upper, means spaced from the inner surface of the upper for supporting an insole, a holddown for holding the insole in position on the insole supporting means, a lever on which said holddown is mounted for movement heightwise of an upper in the machine, an arm on which said lever is fulcrumed, and means mounted on the arm and the lever for advancing the holddown into insole engaging position.

31. In a machine for assembling an insole and a prefitted upper, means spaced from the inner surface of the upper for supporting an insole, a holddown for holding the insole in position on the insole supporting means, a lever on which said holddown is mounted for movement heightwise of an upper in the machine, an arm on which said lever is fulcrumed, means mounted on the arm and the lever for manually advancing the holddown into insole engaging position, and means on said arm for holding said holddown member against movement away from the insole.

EDWARD QUINN.
ISRAEL I. HERSEY.

REFERENCES CITED

The following references are of record in the file of this patent:

UNITED STATES PATENTS

| Number | Name | Date |
|---|---|---|
| 308,527 | Smith | Nov. 25, 1884 |
| 785,432 | Perkins | Mar. 21, 1905 |
| 1,409,521 | Blake et al. | Mar. 14, 1922 |
| 1,697,983 | Lancaster | Jan. 8, 1929 |
| 1,710,161 | Gouldbourn et al. | Apr. 23, 1929 |
| 2,135,016 | Sandt | Nov. 1, 1938 |
| 2,167,738 | Barna | Aug. 1, 1939 |
| 2,181,896 | Jorgensen | Dec. 5, 1939 |
| 2,242,251 | Lancaster | May 20, 1941 |
| 2,316,290 | Schenbeck | Apr. 13, 1943 |
| 2,319,377 | Wallace et al. | May 18, 1943 |
| 2,386,397 | Holmgren | Oct. 9, 1945 |
| 2,406,462 | Holmgren | Aug. 27, 1946 |
| 2,412,449 | Engel | Dec. 10, 1946 |
| 2,416,589 | Millar | Feb. 25, 1947 |

FOREIGN PATENTS

| Number | Country | Date |
|---|---|---|
| 6,772 | Great Britain | of 1890 |
| 427,062 | France | May 19, 1911 |